UNITED STATES PATENT OFFICE.

HENRY LESTER, OF CINCINNATI, OHIO.

IMPROVEMENT IN ROOFING COMPOSITIONS.

Specification forming part of Letters Patent No. 22,653, dated January 11, 1859; Reissue No. 1,044, dated September 18, 1860.

*To all whom it may concern:*

Be it known that I, HENRY LESTER, of the city of Cincinnati, in the county of Hamilton and State of Ohio, have invented a new and useful Composition for Roofing and all Similar Purposes, which is to be known as "Lester's Improved Mastic Roofing;" and I do hereby declare that the following is a full and exact description of the said invention, the manner of making, compounding, and applying the composition to roofs of houses, railroad-cars, steamboats, and for all similar purposes.

The ingredients used consist of pitch, rosin, coal-tar, rubber or gutta-percha, calcined plaster-of-paris, soapstone, rosin-oil, linseed-oil, turpentine, gum-copal, fire-proof paint, charcoal, japan, and white lead.

The nature of my invention consists in mixing and applying the above ingredients to canvas in such proportions that the roofing, when finished, will not run, crack, or scale off, as most all other compositions for roofs do, and that will successfully withstand the action of the weather in all climates.

The manner of preparing the material is as follows:

No. 1. In a kettle of sufficient capacity put one (1) barrel of rosin, one (1) barrel of pitch, and from twenty-three (23) to twenty-eight (28) gallons of coal-tar, (depending upon the season,) and melt them down to a liquid. When this mixture is boiling hot, pour in gradually (stirring well) sixteen (16) gallons of calcined plaster-of-paris. When it boils sufficiently to get the plaster well incorporated with the other ingredients, I then allow the whole to cool down to a moderate heat, when I proceed to saturate heavy cotton drilling or duck in this solution by passing the end of the canvas over the edge of the kettle, down under a roller, up between a pair of scrapers, out onto a long box-table filled about an inch deep with powdered soapstone. I then throw or sift soapstone on the saturated canvas, and rub it thoroughly with the hands. I now sweep off all the surplus soapstone.

No. 2. In another vessel of sufficient capacity I put thirty (30) gallons of coal-tar, two gallons of rubber or gutta-percha solution, (rubber or gutta-percha dissolved in turpentine,) four (4) gallons of fire-proof paint, five and one-half (5½) gallons of powdered charcoal, one-half (½) gallon of linseed-oil, two (2) gallons rosin-oil, one and one-half (1½) gallon of turpentine, and five and one-half (5½) pounds of gum-copal. (These last four must be mixed by themselves by melting the gum and introducing the oils and turpentine while the gum is hot.) These ingredients must be well stirred, while mixing, to prevent the paint and charcoal from settling at the bottom of the vessel.

No. 3. In another vessel or kettle of sufficient capacity put fifty-five (55) pounds of gum-copal and melt it. When thoroughly melted, pour in four (4) gallons of raw linseed-oil, twenty (20) gallons of rosin-oil, ten (10) gallons of turpentine, and two (2) gallons of japan. Draw this off into another vessel, and mix into it fire-proof paint enough to make about the thickness of coal-tar.

No. 4. I then put into the kettle seventy-five (75) pounds of gum-copal and melt it. When thoroughly melted, pour in twenty (20) gallons of raw linseed-oil, ten (10) gallons of rosin-oil, five (5) gallons of turpentine, and one (1) gallon of japan. Draw this off into another vessel, and mix into it fire-proof paint enough to make it about the thickness of coal-tar. Then mix in eighty (80) pounds of white lead, previously thinned with linseed-oil.

When I wish to put on a new roof, I cover the boards with dry roofing-paper, then stretch the saturated canvas over it, lapping one sheet upon the other, cement (using solution No. 2) joints, and nail them together. I then take solution No. 2, and with an ordinary wide wall-brush cement or paint over the whole canvased roof a heavy coat, after which I put on a smalting of sand. In some cases I cover the boards with the paper and saturated canvas, cementing the joints with solution marked No. 2, and nailing them together, and then with a brush paint the canvas with solution No. 3. Then I put on a smalting of sand. When the first coat gets a little dry, I sweep off all the loose sand and put on a coat of solution No. 4, sanding it also, when the roof is completed.

The uses of the ingredients I compound are as follows: The pitch, rosin, tar, rosin-oil, and linseed-oil are to give body to the whole; the calcined plaster-of-paris to destroy the ammonia in the tar; soapstone is to fill up the pores of the saturated canvas and give to it a more compact body, also to enable me to handle the canvas without fear of sticking when rolled up; rubber is to give elasticity to the cement and prevent cracking; paint and charcoal as driers, and to give body to the cement; gum-copal to harden the surface, to resist all ordinary external forces; white lead to give a more solid body to the cement, and japan as a drier. By the term "fire-proof paint" I mean an article used very commonly by painters in coating brick-work as a substitute for ocher. It is nothing more or less than a powdered or pulverized clay found at Akron, Ohio.

The four different mixtures herein described and set forth are intended to form one composition for roofing, the perfect combination of which is secured in the manner herein described.

I believe the proportions of the materials I use are the only ones from which a composition for roofing can be made that will not crack, run, scale off, and that will successfully withstand the action of the weather in any climate.

I am well aware that the manner herein described for applying my saturated canvas and cements to roofs is very little, if any, different from the ordinary way of applying canvas and cement or paint to roofs. I therefore do not wish to be understood as claiming the manner of applying my saturated canvas and cements (after they are manufactured) directly to roofs, as herein described, nor of any of the within-named ingredients when taken separately; but What I do claim, and desire to secure by Letters Patent, is—

1. Saturating the canvas in the mixture or composition herein described and set forth under the head of No. 1, and then applying the soapstone, in the manner described, to the saturated canvas.

2. Covering the soapstoned saturated canvas with the cements compounded from the ingredients and in the proportions set forth under the heads of Nos. 2, 3, and 4 of this specification, the whole being intended to form one composition for roofing and similar purposes, produced from the mixture of the ingredients herein described, in the proportions and for the purposes set forth.

HENRY LESTER.

In presence of—
I. R. BALDRIDGE,
I. H. WOODRUFF.